US010651916B2

(12) United States Patent
Ghosh

(10) Patent No.: US 10,651,916 B2
(45) Date of Patent: May 12, 2020

(54) UPLINK AND DOWNLINK SOUNDING FOR WIRELESS NETWORKS

(71) Applicant: Intel IP Corporation, Santa Clara, CA (US)

(72) Inventor: Chittabrata Ghosh, Fremont, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/773,202

(22) PCT Filed: Jun. 30, 2016

(86) PCT No.: PCT/US2016/040391
§ 371 (c)(1),
(2) Date: May 3, 2018

(87) PCT Pub. No.: WO2017/078803
PCT Pub. Date: May 11, 2017

(65) Prior Publication Data
US 2018/0331749 A1 Nov. 15, 2018

Related U.S. Application Data

(60) Provisional application No. 62/250,014, filed on Nov. 3, 2015, provisional application No. 62/261,992, filed on Dec. 2, 2015.

(51) Int. Cl.
*H04B 7/06* (2006.01)
*H04L 1/00* (2006.01)
(Continued)

(52) U.S. Cl.
CPC .......... *H04B 7/0695* (2013.01); *H04J 3/0632* (2013.01); *H04J 3/0635* (2013.01);
(Continued)

(58) Field of Classification Search
CPC combination set(s) only.
See application file for complete search history.

(56) References Cited

U.S. PATENT DOCUMENTS 9,674,890 B2 * 6/2017 Song .................... H04W 84/12
9,763,259 B2 * 9/2017 Kwon ................. H04W 72/085
(Continued)

FOREIGN PATENT DOCUMENTS

| DE | 112016005032 | 7/2018 |
| WO | WO-2013077652 A1 | 5/2013 |
| WO | WO-2014025476 A1 | 2/2014 |

OTHER PUBLICATIONS

"International Application Serial No. PCT/US2016/040391, International Search Report dated Sep. 12, 2016", 3 pgs.
(Continued)

*Primary Examiner* — Linda Wong
(74) *Attorney, Agent, or Firm* — Schwegman Lundberg & Woessner, P.A.

(57) ABSTRACT

Apparatuses, computer readable media, and methods for uplink and downlink sounding for wireless networks are disclosed. An apparatus of a wireless device is disclosed. The apparatus comprising processing circuity configured to: encode a trigger frame for sounding (TF-S), the TF-S comprising an indication of whether a sounding is for uplink (UL) sounding or (DL) sounding, and the TF-S comprising an indication of stations to participate in the UL sounding or the DL sounding; and configure the wireless device to transmit the TF-S to the stations. The processing circuitry may be further configured to: if the sounding is for the DL sounding, encode a null data packet announcement (NDP-A), encode a null data packet (NDP), configure the wireless device to transmit the NDP-A, and configure the wireless device to transmit the NDP.

30 Claims, 10 Drawing Sheets

(51) Int. Cl.
*H04L 5/00* (2006.01)
*H04J 3/06* (2006.01)
*H04L 1/16* (2006.01)

(52) U.S. Cl.
CPC .............. *H04J 3/0658* (2013.01); *H04L 1/00* (2013.01); *H04L 1/16* (2013.01); *H04L 5/0053* (2013.01); *H04B 7/0626* (2013.01); *H04B 7/0632* (2013.01); *H04L 5/0023* (2013.01)

(56) References Cited

U.S. PATENT DOCUMENTS

| | | | | |
|---:|---|---|---|---|
| 9,839,047 B2* | 12/2017 | Kwon | ............... | H04W 72/1231 |
| 2011/0128929 A1* | 6/2011 | Liu | ................... | H04L 25/03343 |
| | | | | 370/329 |
| 2013/0107916 A1* | 5/2013 | Liu | ...................... | H04B 7/0452 |
| | | | | 375/219 |
| 2013/0272347 A1 | 10/2013 | Merlin et al. | | |
| 2014/0044069 A1* | 2/2014 | Bao | ...................... | H04B 7/0417 |
| | | | | 370/329 |
| 2014/0071955 A1* | 3/2014 | Du | ....................... | H04B 7/0452 |
| | | | | 370/336 |
| 2014/0286246 A1* | 9/2014 | Bao | ...................... | H04L 1/0026 |
| | | | | 370/329 |
| 2015/0085777 A1 | 3/2015 | Seok | | |
| 2015/0156794 A1* | 6/2015 | Kwon | ............... | H04W 72/1231 |
| | | | | 370/329 |
| 2015/0270880 A1 | 9/2015 | Harel et al. | | |
| 2016/0081075 A1* | 3/2016 | Kim | ..................... | H04B 7/0619 |
| | | | | 370/329 |
| 2016/0088641 A1* | 3/2016 | Kwon | ................. | H04W 72/085 |
| | | | | 370/329 |
| 2016/0119902 A1* | 4/2016 | Cheong | ................. | H04W 48/12 |
| | | | | 370/329 |
| 2016/0119933 A1* | 4/2016 | Merlin | .................. | H04L 5/0048 |
| | | | | 370/312 |
| 2016/0128024 A1* | 5/2016 | Frederiks | .............. | H04B 7/0452 |
| | | | | 370/329 |
| 2016/0143026 A1* | 5/2016 | Seok | ................. | H04W 72/0413 |
| | | | | 370/329 |
| 2016/0295581 A1* | 10/2016 | Ghosh | .................... | H04L 1/1614 |
| 2017/0170937 A1* | 6/2017 | Chun | .................... | H04L 5/0048 |
| 2017/0289911 A1* | 10/2017 | Kim | ..................... | H04W 28/06 |
| 2018/0220443 A1* | 8/2018 | Kim | ..................... | H04W 84/12 |
| 2018/0263047 A1* | 9/2018 | Kim | ......................... | H04B 7/26 |
| 2018/0331749 A1* | 11/2018 | Ghosh | .................. | H04L 5/0053 |
| 2019/0014491 A1* | 1/2019 | Seok | ..................... | H04W 12/06 |
| 2019/0341988 A1* | 11/2019 | Schelstraete | ......... | H04B 7/0452 |

OTHER PUBLICATIONS

"International Application Serial No. PCT/US2016/040391, Written Opinion dated Sep. 12, 2016", 5 pgs.

"International Application Serial No. PCT US2016 040391, International Preliminary Report on Patentability dated May 17, 2018", 7 pgs.

"German Application Serial No. 112016005032.1, Voluntary Amendment filed Nov. 12, 2019", w English Claims, 19 pgs.

* cited by examiner

UPLINK AND DOWNLINK SOUNDING FOR WIRELESS NETWORKS

PRIORITY CLAIM

This application is a U.S. National Stage Filing under 35 U.S.C. 371 from International Application No. PCT/US2016/040391, filed Jun. 30, 2016 and published in English as WO 2017/078803 on May 11, 2017, which claims the benefit of priority to U.S. Provisional Patent Application Ser. No. 62/250,014, filed Nov. 3, 2015, and U.S. Provisional Patent Application Ser. No. 62/261,992, filed Dec. 2, 2015, each of which is incorporated herein by reference in its entirety.

TECHNICAL FIELD

Embodiments pertain to wireless networks and wireless communications. Some embodiments relate to wireless local area networks (WLANs) and Wi-Fi networks including networks operating in accordance with the IEEE 802.11 family of standards. Some embodiments relate to IEEE 802.1 lax. Some embodiments relate to methods, computer readable media, and apparatus for uplink and downlink sounding for wireless networks.

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
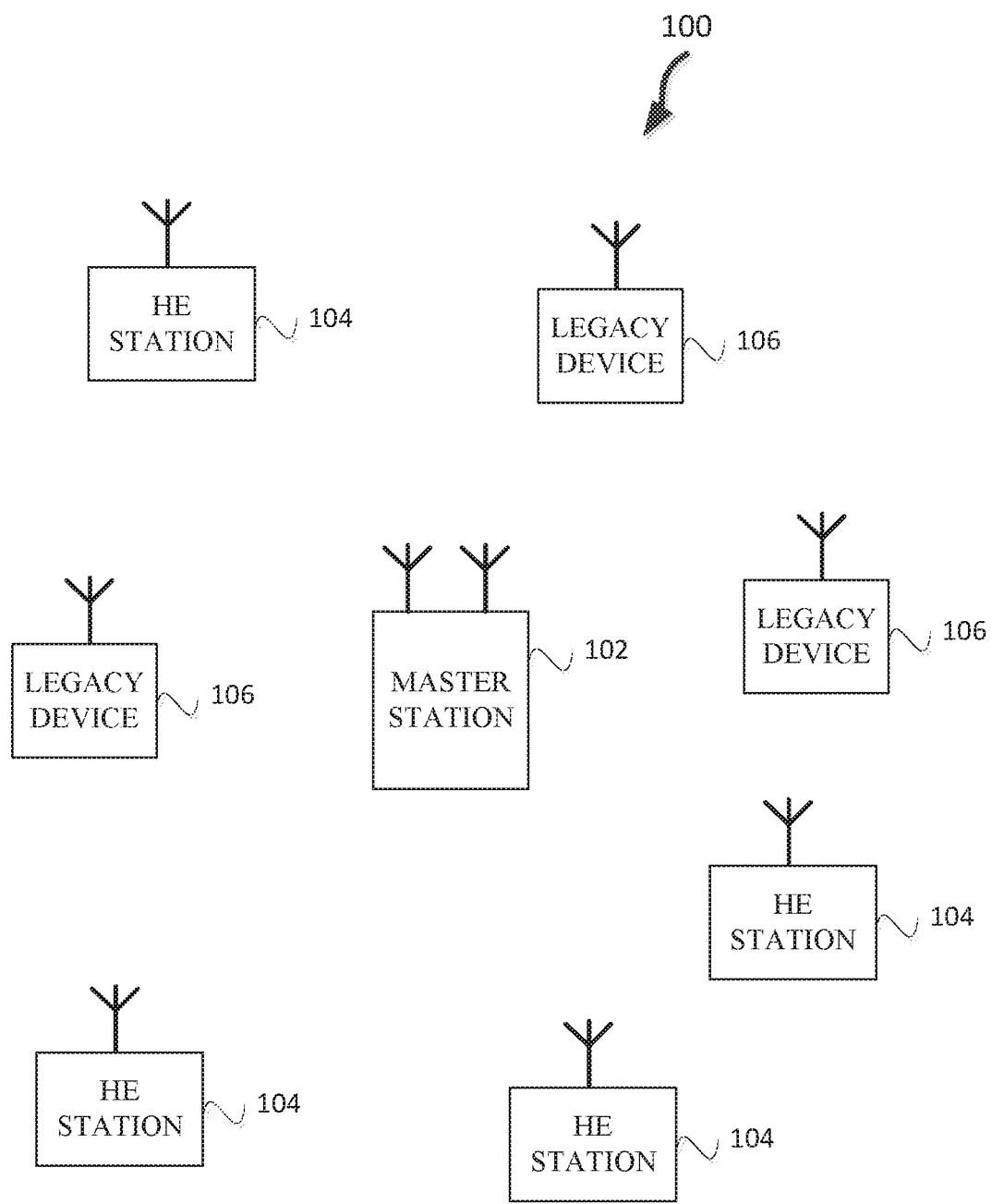
FIG. 1 illustrates a WLAN in accordance with some embodiments.

FIG. 1 illustrates a WLAN 100 in accordance with some embodiments. The WLAN may comprise a basis service set (BSS) 100 that may include a master station 102, which may be an AP, a plurality of high-efficiency (HE) (e.g., IEEE 802.1 lax) stations 104, and a plurality of legacy (e.g., IEEE 802.11n/ac) devices 106.

The master station 102 may be an AP using one of the IEEE 802.11 protocols to transmit and receive. The master station 102 may be a base station. The master station 102 may use other communications protocols as well as the IEEE 802.11 protocol. The IEEE 802.11 protocol may be IEEE 802.11 ax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). The master station 102 and/or HE station 104 may use one or both of MU-MIMO and OFDMA. There may be more than one master station 102 that is part of an extended service set (ESS). A controller (not illustrated) may store information that is common to the more than one master station 102. The controller may have access to an external network such as the Internet.

The legacy devices 106 may operate in accordance with one or more of IEEE 802.11 a/b/g/n/ac/ad/af/ah/aj, or another legacy wireless communication standard. The legacy devices 106 may be STAs or IEEE 802.11 STAs. The HE stations 104 may be wireless transmit and receive devices such as cellular telephone, smart telephone, hand-held wireless device, wireless glasses, wireless watch, wireless personal device, tablet, or another device that may be transmitting and receiving using the IEEE 802.11 protocol such as IEEE 802.11ax or another wireless protocol such as IEEE 802.11az. In some embodiments, the HE stations 104, master station 102, and/or legacy devices 106 may be termed wireless devices. In some embodiments the HE station 104 may be a "group owner" (GO) for peer-to-peer modes of operation where the HE station 104 may perform some operations of a master station 102.

The master station 102 may communicate with legacy devices 106 in accordance with legacy IEEE 802.11 communication techniques. In example embodiments, the master station 102 may also be configured to communicate with HE stations 104 in accordance with legacy IEEE 802.11 communication techniques.

In some embodiments, a HE frame may be configurable to have the same bandwidth as a channel. The bandwidth of a channel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a channel may be 1 MHz, 1.25 MHz, 2.03 MHz, 2.5 MHz, 5 MHz and 10 MHz, or a combination thereof or another bandwidth that is less or equal to the available bandwidth may also be used. In some embodiments the bandwidth of the channels may be based on a number of active subcarriers. In some embodiments the bandwidth of the channels are multiples of 26 (e.g., 26, 52, 104, etc.) active subcarriers or tones that are spaced by 20 MHz. In some embodiments the bandwidth of the channels are 26, 52, 104, 242, etc. active data subcarriers or tones that are space 20 MHz apart. In some embodiments the bandwidth of the channels is 256 tones spaced by 20 MHz. In some embodiments a 20 MHz channel may comprise 256 tones for a 256 point Fast Fourier Transform (FFT). In some embodiments, a different number of tones is used. In some embodiments, the OFDMA structure consists of a 26-subcarrier resource unit (RU), 52-subcarrier RU, 106-subcarrier RU, 242-subcarrier RU, 484-subcarrier RU and 996-subcarrier RU. Resource allocations for single user (SU) consist of a 242 subcarrier RU, 484-subcarrier RU, 996-subcarrier RU and 2×996-subcarrier RU.

A HE frame may be configured for transmitting a number of spatial streams, which may be in accordance with MU-MIMO. In some embodiments, a HE frame may be configured for transmitting in accordance with one or both of OFDMA and MU-MIMO. In other embodiments, the master station 102, HE station 104, and/or legacy device 106 may also implement different technologies such as code division multiple access (CDMA) 2000, CDMA 2000 1×, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, WiMAX, WiGig, or other technologies.

Some embodiments relate to HE communications. In accordance with some IEEE 802.1 lax embodiments, a master station 102 may operate as a master station which may be arranged to contend for a wireless medium (e.g., during a contention period) to receive exclusive control of the medium for an HE control period. In some embodiments, the HE control period may be termed a transmission opportunity (TXOP). The master station 102 may transmit a HE master-sync transmission, which may be a trigger frame or HE control and schedule transmission, at the beginning of the HE control period. The master station 102 may transmit a time duration of the TXOP and channel information. During the HE control period, HE stations 104 may communicate with the master station 102 in accordance with a non-contention based multiple access technique such as OFDMA and/or MU-MIMO. This is unlike conventional WLAN communications in which devices communicate in accordance with a contention-based communication technique, rather than a multiple access technique. During the HE control period, the master station 102 may communicate with HE stations 104 using one or more HE frames. During the HE control period, the HE STAs 104 may operate on a channel smaller than the operating range of the master station 102. During the HE control period, legacy stations refrain from communicating.

In accordance with some embodiments, during the master-sync transmission the HE STAs 104 may contend for the wireless medium with the legacy devices 106 being excluded from contending for the wireless medium during the master-sync transmission or TXOP. In some embodiments the trigger frame may indicate an uplink (UL) UL-MU-MIMO and/or UL OFDMA control period. In some embodiments, the trigger frame may indicate a portions of the TXOP that are contention based for some HE station 104 and portions that are not contention based.

In some embodiments, the multiple-access technique used during the HE control period may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique.

In example embodiments, the HE device 104 and/or the master station 102 are configured to perform the methods and operations herein described in conjunction with FIGS. 1-10.

Figure 2:
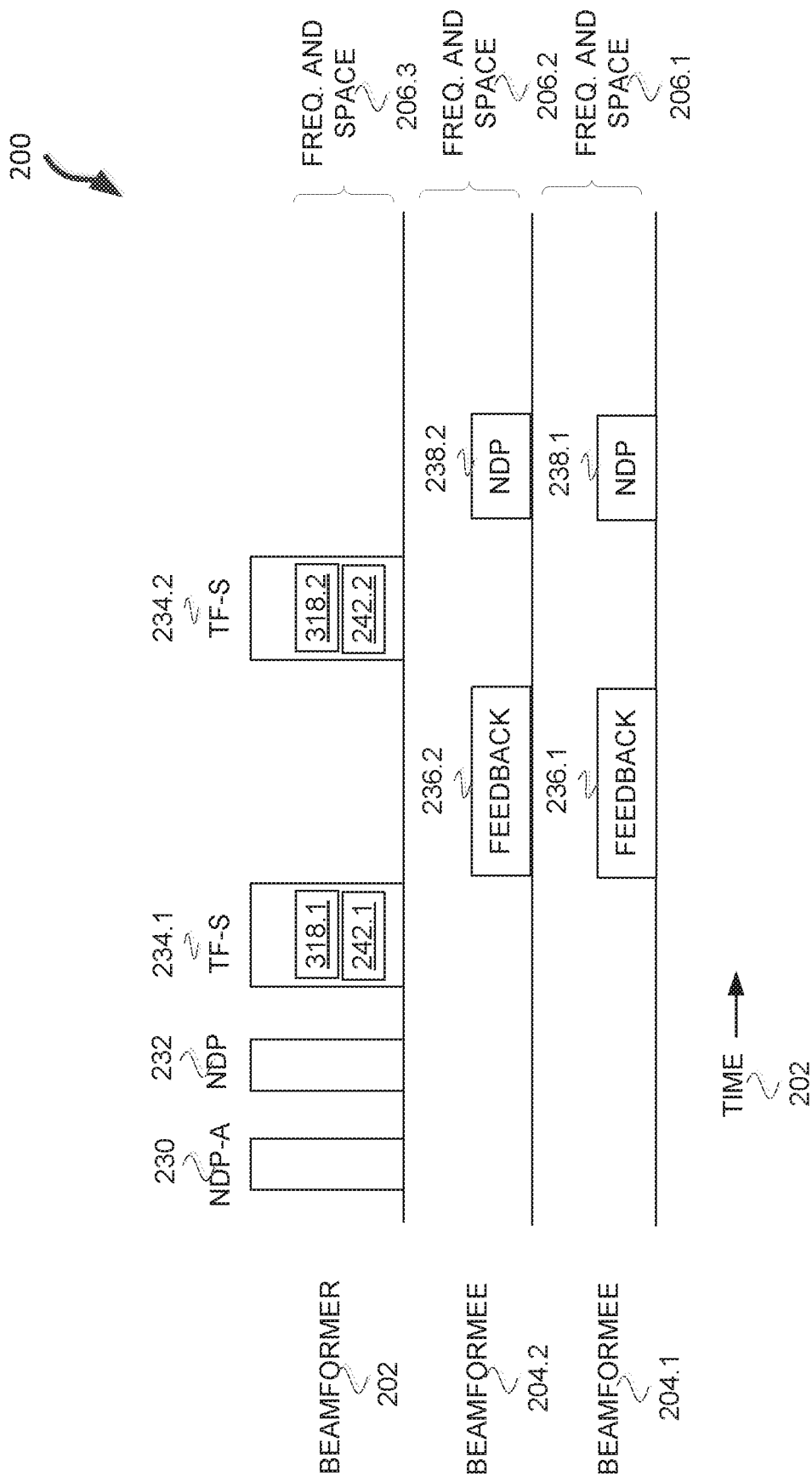
FIG. 2 illustrates a method for uplink (UL) and downlink (DL) sounding in accordance with some embodiments.

FIG. 2 illustrates a method 200 for uplink (UL) and downlink (DL) sounding in accordance with some embodiments. Illustrated in FIG. 2 is time 202 along a horizontal axis, frequency and space 206 along a vertical axis, beamformees 204, and beamformer 202. The beamformees 204 and beamformer 202 may be master stations 102 and/or HE stations 104. The frequency and space 206 may be a bandwidth for a channel as described herein and spatial streams. The frequencies and space 206 may overlap or be the same frequency. For example, frequency and space 206.3 may be a primary 20 MHz channel, and frequency and space 206.2 and frequency and space 206.1 may be secondary 20 MHz channels.

The method 200 may begin with the beamformer 202 transmitting a null data packet announcement (NDP-A) 230 packet. The NDP-A 230 packet may be an announcement to the beamformees 204 of a DL sounding. The method 200 may continue with the beamformer 232 transmitting a null data packet (NDP) 232. The beamformees 204 receive the NDP 232 and perform channel measurements or sounding. In some embodiments, the beamformees 204 determine one or more of a signal to noise ratio, a received signal strength, a feedback or steering matrix, and channel state information (CSI). In some embodiments, the type of feedback to provide is included in the NDP-A 230, an information element of a frame before the NDP-A 230, or in the TF-S 234.1.

The method 200 continues with the beamformer 202 transmitting a trigger frame for sounding (TF-S) 234.1. The TF-S 234.1 may include an UL/DL indication 318.1 (see FIG. 3) and a resource allocation 242.1 for the beamformees 204 to transmit the feedback 236. The UL/DL indication 318.1 indicates a DL sounding. The resource allocation 242 may include a channel, duration, spatial streams, modulation and coding scheme, etc., for the beamformees 204 to use to transmit the feedback 236.

The method 200 continues with the beamformees 204 transmitting the feedback 236 in accordance with the resource allocation 242. The beamformees 204 may transmit the feedback 236 in accordance with OFDMA and/or MU-MIMO.

The method 200 continues with the beamformer 202 transmitting the TF-S 234.2. The TF-S 234.2 may include a resource allocation 242.1 and a UL/DL indication 318.2. The UL/DL indication 318.2 indicates a UL sounding. The resource allocation 242.1 may include a channel, duration, spatial streams, modulation and coding scheme, etc., for the beamformees 204 to use to transmit the NDP 238.

The method 200 continues with the beamformees 204 transmitting the NDP 238 in accordance with the resource allocation 242.1. The beamformer 202 may receive the NDP 238 and determine how better to transmit to the beamformees 204, e.g., the beamformer 202 may determine new steering matrixes to use to transmit to the beamformees 204.

The TF-S 234.1 and TF-S 234.2 may be in accordance with TF-S 300. In some embodiments the order of the transmission of the frames may be different. For example, in some embodiments, the TF-S 234.1 may be transmitted before the NDP 232, or before NDP-A 230 and NDP 232.

Figure 3:
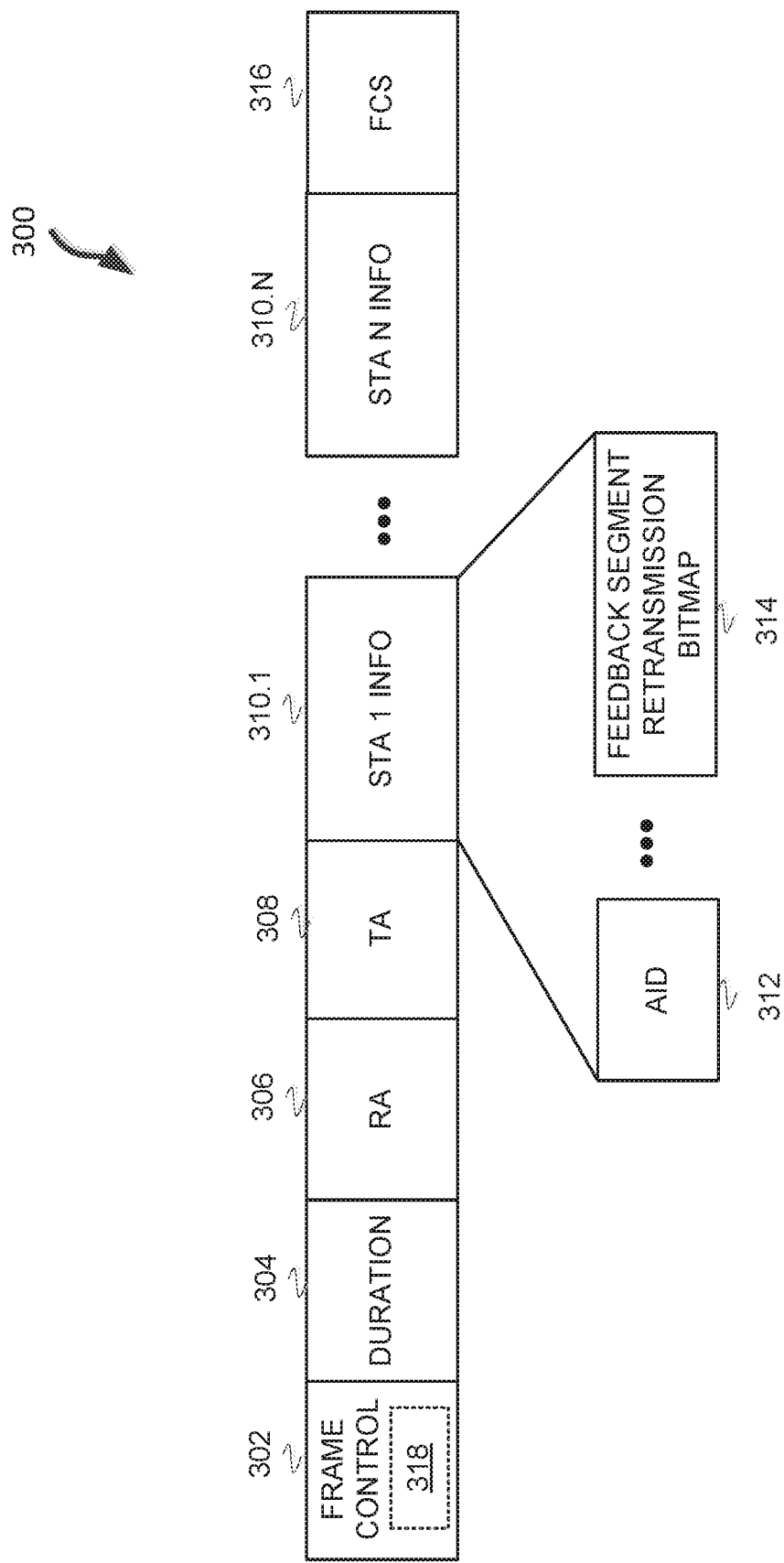
FIG. 3 illustrates a trigger frame for sounding (TF-S) in accordance with some embodiments.

FIG. 3 illustrates a trigger frame for sounding (TF-S) 300 in accordance with some embodiments. Illustrated in FIG. 3 is frame control 302, duration 304, receiver address (RA) 306, transmitter address (TA) 308, STA 1 information 310.1 through STA N information 310.n, and frame check sequence (FCS) 316.

The frame control 302 may include an UL/DL indication 318. The UL % DL indication 318 may be one bit and may indicate whether the trigger frame is for a DL sounding or an UL sounding. Wireless devices (e.g., HE station 104 and/or master stations 102) transmit UL beamforming feedback reports upon receiving the TF-S 300 with the UL/DL indication 318 indicating DL sounding, in accordance with some embodiments. Wireless devices transmit NDP frames upon receiving the TF-S 300 with the UL/DL indication 318 indicating UL sounding, in accordance with some embodiments.

In some embodiments, the UL/DL indication 318 may be one bit in the frame control 302. In some embodiments, if UL/DL indication 318 is set to 1 bit, UL/DL indication 318 indicates DL sounding, and if the bit is set to 0, the UL/DL indication 318 indicates UL sounding. The roles of 0 and 1 may be reversed. In some embodiments, the UL/DL indication 318 may be in a media access control (MAC) header, e.g., the frame control 302 or another field of the MAC header. In some embodiments, the UL/DL indication 318 may be in a physical (PHY) header (not illustrated) of the TF-S 300.

In some embodiments, the STA information 310 may include response and segment information, an AID 312 (e.g., the AID of STA 1) and feedback segment retransmission bitmap 314. The STA 1 information 310 may include a resource allocation and wireless parameters for STA 1 to use to transmit the NDP or the feedback report. The STA 1 information 310 may include an indication of the type of feedback report, e.g. signal to noise ratio, a received signal strength, a feedback or steering matrix, and channel state information (CSI). The feedback segment retransmission bitmap 314 may indicate that if a bit is set that it indicates a request for retransmission of a specific segment of the feedback or steering matrix.

The duration 304 may be a duration for other wireless devices to defer. RA 306 may be an association identification (AID) of a wireless device to receive the TF-S 300, which may be multi-cast or broadcast. The TA 308 may be a AID of the wireless device that transmitted the TF-S 300, e.g., the beamformer. The FCS 316 may be a checksum appended to the TF-S 300 frame for error detection and/or correction.

Figure 4:
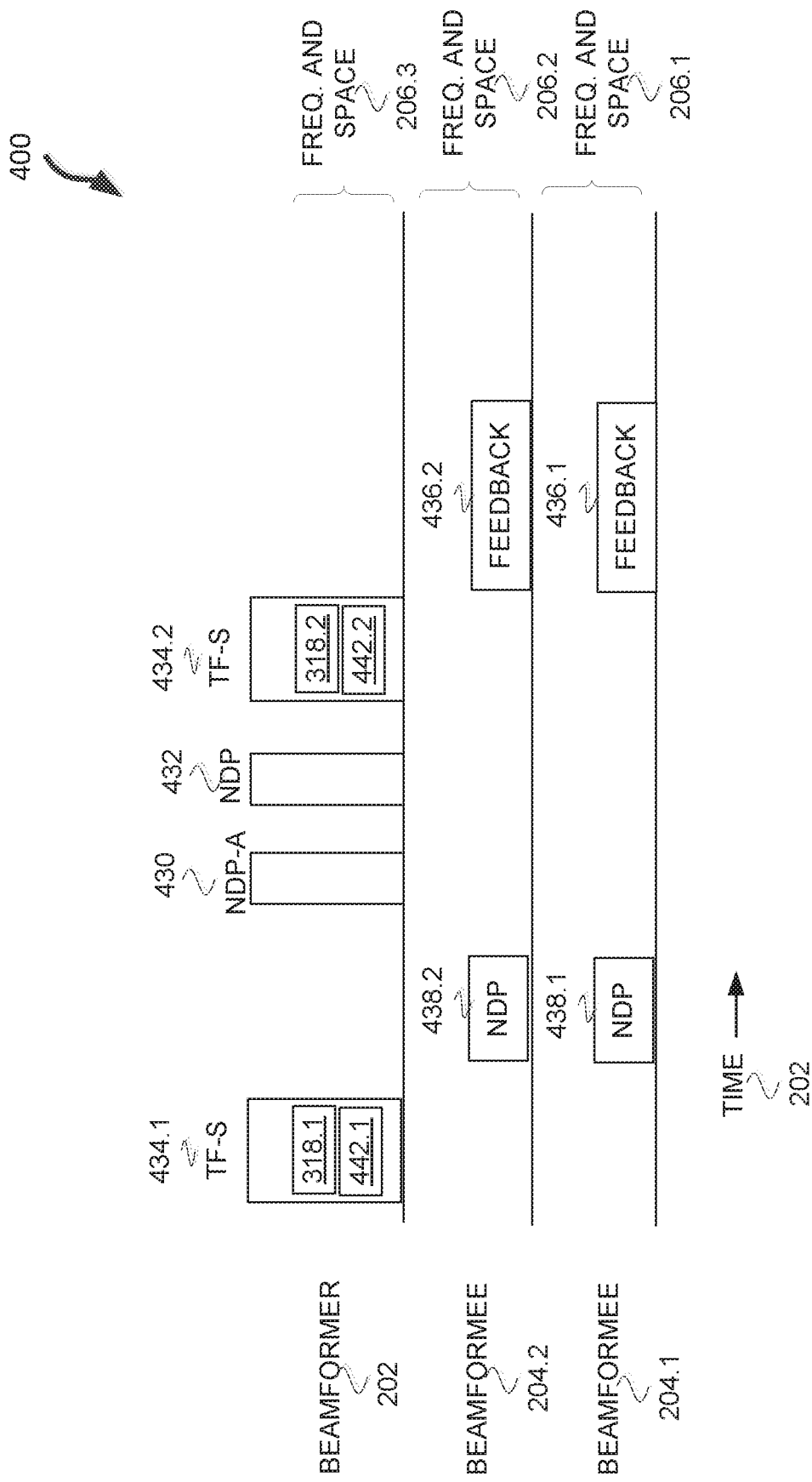
FIG. 4 illustrates a method for UL and DL sounding in accordance with some embodiments.

FIG. 4 illustrates a method 400 for UL and DL sounding in accordance with some embodiments. Illustrated in FIG. 4 is time 202 along a horizontal axis, frequency and space 206 along a vertical axis, beamformees 204, and beamformer 202.

The method 400 begins with the beamformer 202 transmitting the TF-S 234.1. The TF-S 234.1 may include a resource allocation 442.1 and a UL/DL indication 318.1. The UL/DL indication 318.1 indicates a UL sounding. The resource allocation 442.1 may include a channel, duration, spatial streams, modulation and coding scheme, etc., for the beamformees 204 to use to transmit the NDP 438.

The method 400 continues with the beamformees 204 transmitting the NDP 438 in accordance with the resource allocation 442.1. The beamformer 202 may receive the NDP 438 and determine how better to transmit to the beamformees 204, e.g., the beamformer 202 may determine new steering matrixes to use to transmit to the beamformees 204.

The method 400 may continue with the beamformer 202 transmitting a NDP-A 430 packet. The NDP-A 430 packet may be an announcement to the beamformees 204 of a DL sounding. The method 400 may continue with the beamformer 232 transmitting a NDP 432. The beamformees 204 receive the NDP 232 and perform channel measurements or sounding. In some embodiments, the beamformees 204 determine one or more of a signal to noise ratio, a received signal strength, a feedback or steering matrix, and CSI. In some embodiments, the type of feedback to provide is included in the NDP-A 430, an information element of a frame before the NDP-A 430, or in the TF-S 434.2.

The method 400 continues with the beamformer 202 transmitting a TF-S 434.2. The TF-S 434.2 may include an UL/DL indication 318.2 (see FIG. 3) and a resource allocation 442.1 for the beamformees 204 to transmit the feedback 436. The UL/DL indication 318.2 indicates a DL sounding. The resource allocation 442 may include a channel, duration, spatial streams, modulation and coding scheme, etc., for the beamformees 204 to use to transmit the feedback 436.

The method 400 continues with the beamformees 204 transmitting the feedback 436 in accordance with the resource allocation 442. The beamformees 204 may transmit the feedback 436 in accordance with OFDMA and/or MU-MIMO.

In some embodiments, the NDP-A 430 may be transmitted before the TF-S 434.1 to announce both the UL sounding and the DL sounding. The method would have the following sequence NDP-A 430, TF-S 434.1, NDP 438, NDP 432, and TF-S 434.2. In some embodiments the sequence may be NDP-A 430, TF-S 434.1, NDP 438, TF-S 434.2, and NDP 432.

In some embodiments, the NDP-A or the TFS may include an indication of one of the following: announcement of DL sounding in one or multiple phases, DL sounding followed by UL sounding (e.g., FIG. 2), UL sounding followed by DL sounding (e.g., FIG. 4), and only UL sounding. The DL sounding only may be NDP-A 430, NDP 432, and TF-S 434.2; or, NDP-A 430, TF-S 434.2, and NDP 432. The DL sounding only may have multiple phases, e.g., there may be multiple NDPs 432 and TF-S 434. The UL sounding only may be TF-S 434.1 and NDP 438; or, NDP-A 430, TF-S 434.1, and NDP 448.1.

Figure 5:
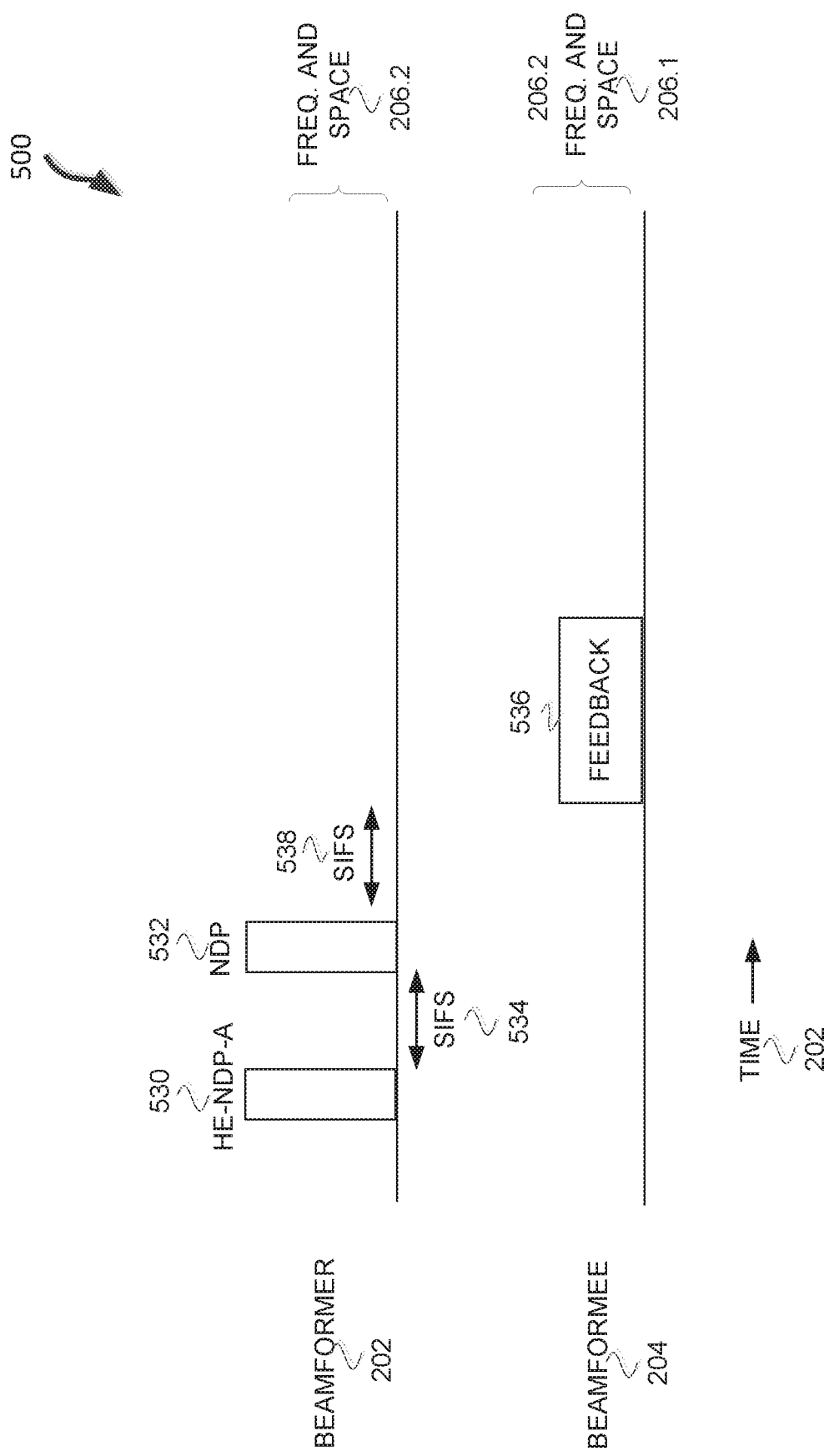
FIG. 5 illustrates a method for DL sounding in accordance with some embodiments.

FIG. 5 illustrates a method 500 for DL sounding in accordance with some embodiments. Illustrated in FIG. 5 is time 202 along a horizontal axis, frequency and space 206 along a vertical axis, beamformees 204, and beamformer 202.

The method 500 begins with the beamformer 202 transmitting a HE-NDP-A 530. The HE-NDP-A 530 packet may be an announcement to the beamformee 204 of a DL sounding. The HE-NDP-A 530 may be a HE-NDP-A 700. As disclosed in conjunction with FIG. 7, the number of stations may be indicated as 1, and the RA 706 may be equal to the AID 720 to indicate that the sounding is a SU sounding.

An UL/DL indication 718 of the HE-NDP-A 530 may indicate that this is DL sounding. Assigned RU 712 may indicate a resource unit for the beamformee 204 to use to transmit the feedback 536. The NC index 724 field indicates a number of columns for the feedback matrix minus 1. The STA 1 information 710.1 (e.g., the feedback type 722) may include an indication of the type of feedback report, e.g. signal to noise ratio, a received signal strength, a feedback or steering matrix, and channel state information (CSI).

The method 500 may continue with the beamformer 202 transmitting NDP 532 a SIFS 534 after the HE-NDP-A 530. The beamformee 204 receives the NDP 532 and performs channel measurements or sounding. In some embodiments, the beamformee 204 determine one or more of a signal to noise ratio, a received signal strength, a feedback or steering matrix, and CSI, as indicated by the HE-NDP-A 530. In some embodiments, the type of feedback to provide is included in an information element of a frame before the NDP-A 530.

The method 500 continues with the beamformee 204 transmitting the feedback 536 in accordance with the resource allocation indicated in the HE-NDP-A 530. The beamformee 204 may transmit the feedback 536 in accordance with OFDMA and/or MU-MIMO. The beamformer 202 may use the feedback 536 to improve the beamforming of the beamformer 202 for transmitting to the beamformee 204.

Figure 6:
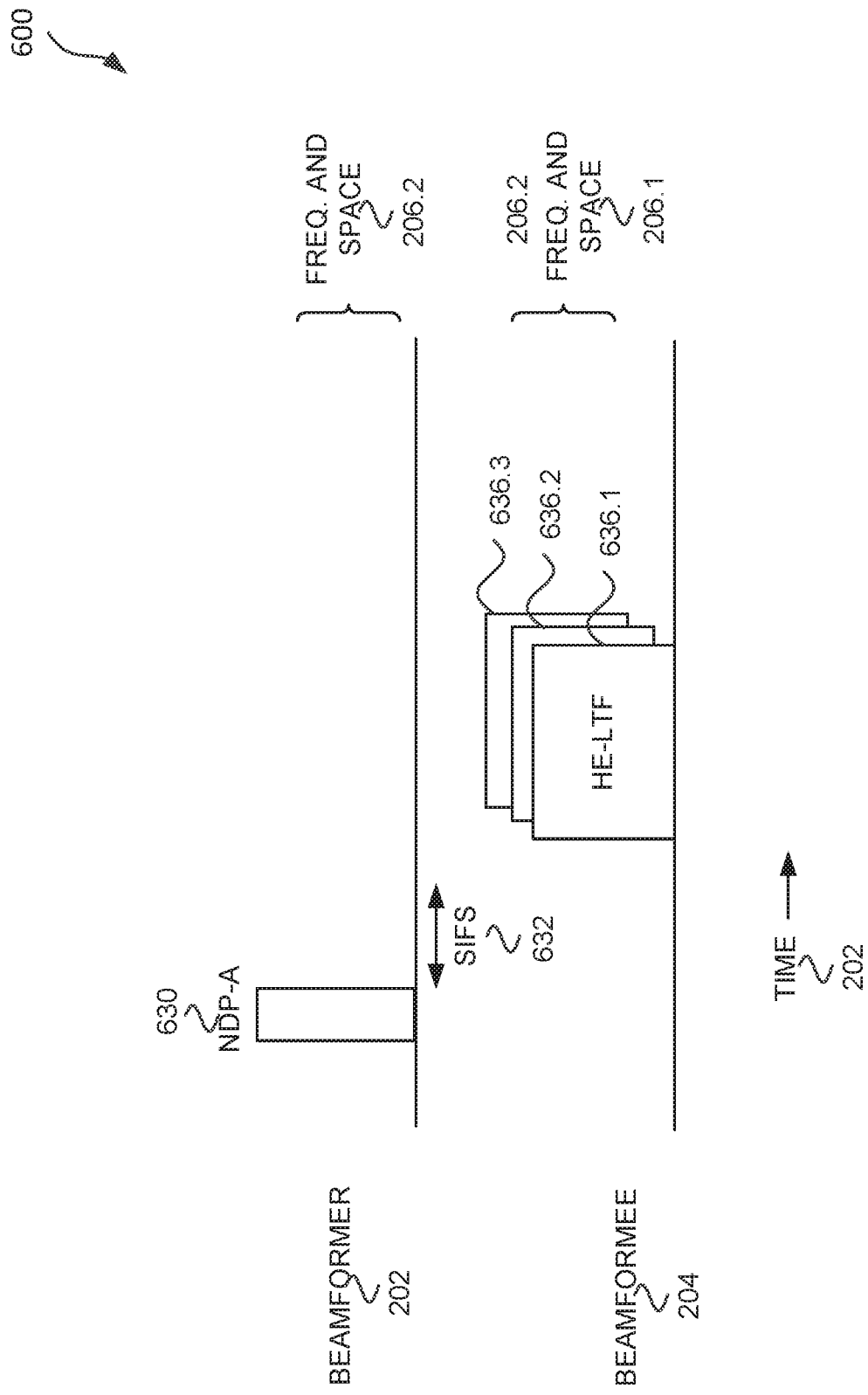
FIG. 6 illustrates a method for UL sounding in accordance with some embodiments.

FIG. 6 illustrates a method 600 for UL sounding in accordance with some embodiments. Illustrated in FIG. 6 is time 202 along a horizontal axis, frequency and space 206 along a vertical axis, beamformees 204, and beamformer 202.

The method 600 begins with the beamformer 202 transmitting a NDP-A 630 frame to the beamformee 204. The HE-NDP-A 630 packet may be an announcement to the beamformee 204 of a UL sounding. The HE-NDP-A 630 may be a HE-NDP-A 700. As disclosed in conjunction with FIG. 7, the number of stations may be indicated as 1, and the RA 706 may be equal to the AID 720 to indicate that the sounding is a SU sounding.

An UL/DL indication 718 of the HE-NDP-A 530 may indicate that this is UL sounding. The sounding dialog number 714 field indicates an RU for the beamformee 704 to use to transmit the NDP. The Nc index 724 field indicates a number of UL NDPs (e.g., number HE-LTFs 636) to be transmitted by the beamformee 204.

The method 600 continues with the beamformee 204 transmitting HE-LTFs 636 a SIFS 632 after NDP-A 630. The beamformee 204 may transmit the HE-LTFs 636 in accordance with the resource allocation in the NDP-A 630. The beamformee 204 may, for example, transmit one HE-LTF 636 per antenna of the beamformee 204 on a channel indicated in the NDP-A 630.

Figure 7:
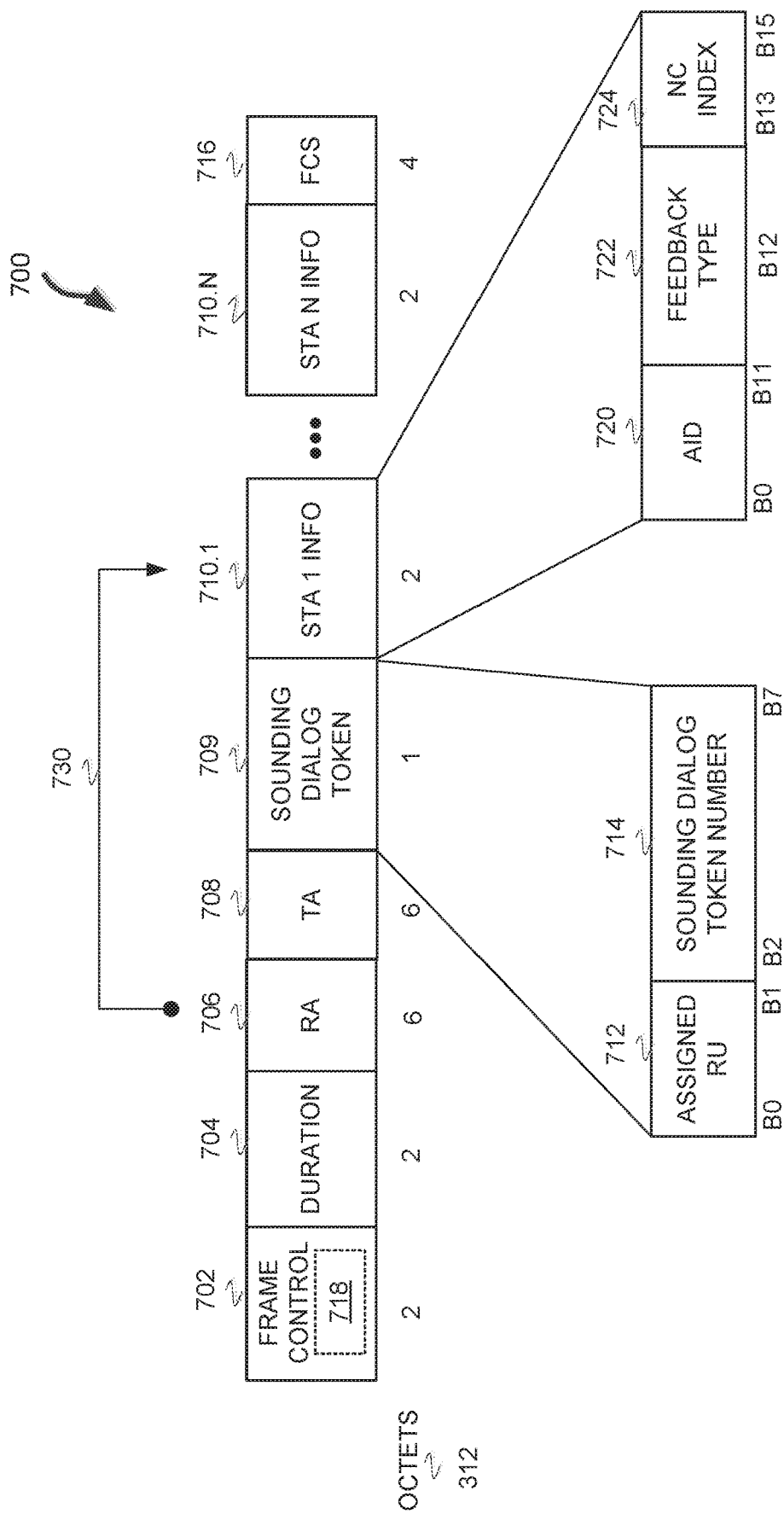
FIG. 7 illustrates a high-efficiency (HE) null data packet announcement (HE-NDP-A) frame in accordance with some embodiments.

FIG. 7 illustrates a high-efficiency (HE) null data packet announcement (HE-NDP-A) 700 frame in accordance with some embodiments. Illustrated in FIG. 7 is frame control 702, duration 704, RA 706, TA 708, sounding dialog token 709, STA 1 information 710.1 through STA N information 710.n, and FCS 716.

The frame control 702 may include an UL/DL indication 718. The UL/DL indication 718 may be one bit and may indicate whether the trigger frame is for a DL sounding or an UL sounding. Wireless devices (e.g., HE station 104 and/or master stations 102) transmit UL beamforming feedback reports upon receiving the HE-NDP-A 700 with the UL/DL indication 718 indicating DL sounding, in accordance with some embodiments. Wireless devices transmit NDP frames upon receiving the HE-NDP-A 700 with the UL/DL indication 718 indicating UL sounding, in accordance with some embodiments.

In some embodiments, the UL/DL indication 718 may be one bit in the frame control 702. In some embodiments, if UL/DL indication 718 is set to 1 bit, UL/DL indication 718 indicates DL sounding, and if the bit is set to 0, the UL/DL indication 718 indicates UL sounding. The roles of 0 and 1 may be reversed. In some embodiments, the UL/DL indication 718 may be in a MAC header, e.g., the frame control 702 or another field of the MAC header. In some embodiments, the UL/DL indication 718 may be in a PHY header (not illustrated) of the HE-NDP-A 700.

In some embodiments, the STA information 710 may include an AID 720 (e.g., the AID of STA 1) and feedback type 722, and Nc index 724. The AID 720 may be an AID of the corresponding STA. The feedback type 722 may indicate a type of feedback, e.g. single user or multiple user. The Nc index 724 may indicate which spatial streams the corresponding STA is to transmit on.

The duration 704 may be a duration for other wireless devices to defer. RA 706 may be an AID of a wireless device to receive the HE-NDP-A 700, which may be multi-cast or broadcast. The TA 708 may be a AID of the wireless device that transmitted the HE-NDP-A 700, e.g., the beamformer. The FCS 716 may be a checksum appended to the HE-NDP-A 700 frame for error detection and/or correction.

In some embodiments, if a STA information field indicates 1 and the RA 306 is equal to the AID 720, (e.g., 730 indicates the RA 706 is equal to the AID 720), then the HE-NDP-A 700 is for a single user (SU). In some embodiments, the feedback type 722 may indicate whether it is SU or MU.

For UL sounding, wireless device (e.g., HE station 104) is to transmit UL NDP (e.g., 238, 438, and 636) in SIFS time after the HE-NDP-A 700 transmission by the second wireless device (e.g., master station 102.)

For DL sounding, wireless device (e.g., HE station 104) is to transmit UL feedback report frame in SIFS time after NDP frame (e.g., 232, 432, and 532) transmitted by the second wireless device (e.g., master station 102).

For UL sounding, assigned wireless device is signaled assigned resource unit (RU) 712 allocation in sounding dialog token 709 for UL NDP frame (e.g., 636).

For UL sounding, value of Nc index 724 indicates number of UL NDPs (e.g., number of LTFs and UL NDP 636) to be sent by the wireless device (e.g., HE station 104).

For DL sounding, assigned wireless device (e.g., HE station 104) is signaled assigned RU 712 in sounding dialog token 709 field for UL feedback report frame (e.g., feedback 536).

For DL sounding assigned wireless device (e.g., HE station 104), value in Nc index 724 field indicates number of columns in feedback matrix minus 1. The sounding dialog token 709 may include assigned RU 712 and sounding dialog token number 714.

In some MU embodiments, if number of STAs information field is greater than 1 and value of RA 706 is broadcast address, then HE-NDP-A 700 is for MU. STAs (e.g., HE stations 104) are to wait for TF-S 300 (e.g., 234) in SIFS time after the NDP (e.g., 232) frame sent by the master station 102 for RU and NSS assignment. In some MU embodiments, the assigned RU 712 is reserved bits for MU HE-NDP-A 700.

In some MU embodiments, STAs indicated (e.g., AID 720) in STA 1 info 710.1 through STA N info 710.n are scheduled for either DL sounding or UL sounding. In some MU embodiments, a TF-S 300 will indicate whether the STAs are to transmit UL NDP (e.g., 238) or UL feedback (e.g., 236).

The value indicated in sounding dialog token number 714 field is signaled in UL feedback report frame for DL sounding by SU STA or MU STAs, in accordance with some embodiments. In some embodiments, for SU STA in UL sounding, the sounding dialog token number 714 field may be included in the UL NDP frame to indicate that this frame is a response of the HE-NDP-A 700 frame with the same sounding token value. In some embodiments, for SU STA in UL sounding, if the sounding dialog token number 714 is indicated in UL NDP frame, this number of the sounding token is indicated in the HE preamble or implicitly indicated in the legacy preamble.

Figure 8:
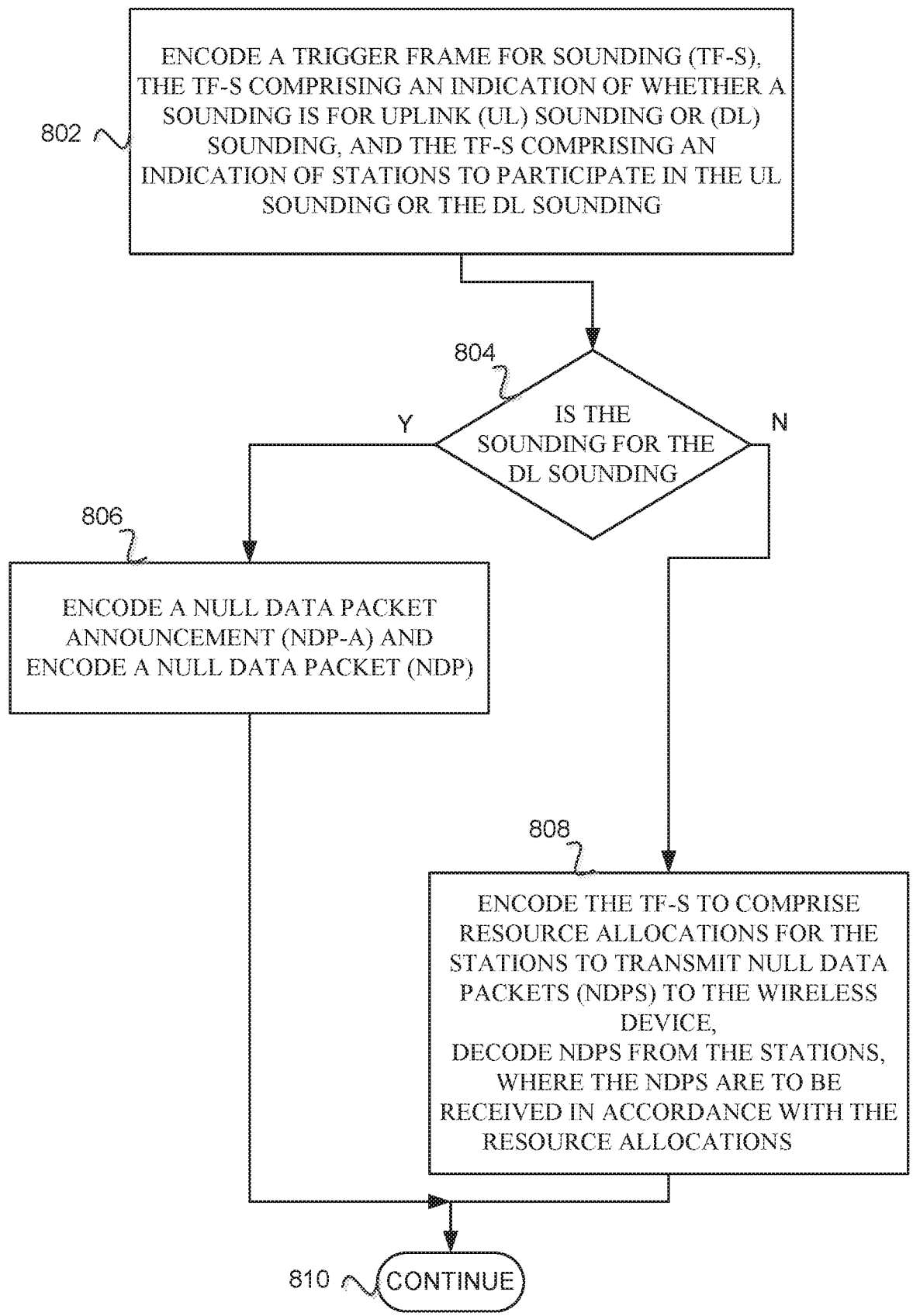
FIG. 8 illustrates a method for UL and DL sounding in accordance with some embodiments.

FIG. 8 illustrates a method 800 for UL and DL sounding in accordance with some embodiments. The method 800 begins at operation 802 with encoding a TF-S, the TF-S comprising an indication of whether a sounding is for UL sounding or DL sounding, and the TF-S comprising an indication of stations to participate in the UL sounding or the DL sounding. For example, TF-S 234.1, TF-S 234.2, TF-S 434.1, and TF-S 434.2. In some embodiments the method continues with an apparatus configuring the wireless device to transmit the TF-S. For example, an apparatus of the beamformer 202 may configure the beamformer 202 to transmit the TF-S.

The method 800 continues at operation 804 with is the sounding for the DL sounding. If the sounding is for the DL sounding, then the method 800 continues at operation 806 with encoding a NDP-A and encoding a NDP. For example, NDP-A 230, NDP 232, NDP-A 430, and NDP 432. In some embodiments, the method 800 continues with configuring the wireless device to transmit the NDP-A, and configuring the wireless device to transmit the NDP. For example, an apparatus of the beamformer 202 may configure the beamformer 202 to transmit NDP-A 230, NDP 232, NDP-A 430, and NDP 432. The method 800 may continue at operation 810 with continuing.

The method 800 continues at operation 808 if the sounding is not for DL sounding with encoding the TF-S to comprise resource allocations for the stations to transmit NDPs to the wireless device, and decoding NDPs from the stations, where the NDPs are to be received in accordance with the resource allocations. For example, resource allocations 242.2 and resource allocations 442.1. As further examples, NDPs 238 and NDPs 438 may be decoded by beamformer 202. The method 800 may continue at operation 810 with continuing.

Figure 9:
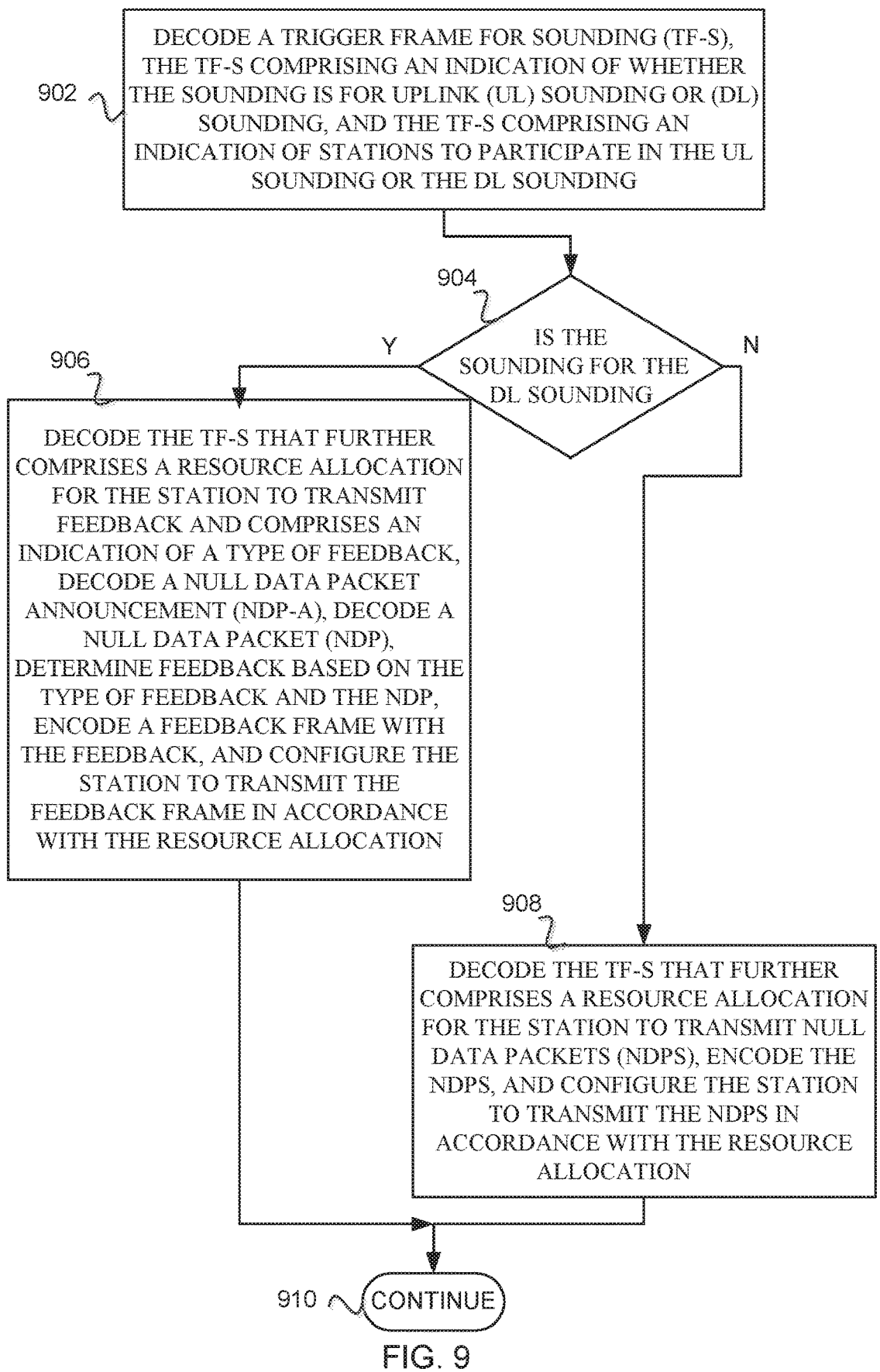
FIG. 9 illustrates a method for UL and DL sounding in accordance with some embodiments.

FIG. 9 illustrates a method 900 for UL and DL sounding in accordance with some embodiments. The method 900 begins at operation 902 with decode a TF-S, the TF-S comprising an indication of whether the sounding is for UL sounding or DL sounding, and the TF-S comprising an indication of stations to participate in the UL sounding or the DL sounding. For example, beamformees 204 may decode TF-Ss 234.1, 234.2, 434.1, and 434.2.

The method 900 may continue at operation 904 with is the sounding for the DL sounding, and if the sounding is for the DL sounding, the method 900 continues at operation 906 with decoding the TF-S that further comprises a resource allocation for the station to transmit feedback and comprises an indication of a type of feedback, decode a NDP-A, decode a NDP, determine feedback based on the type of feedback and the NDP, encode a feedback frame with the feedback, and configure the station to transmit the feedback frame in accordance with the resource allocation. For example, beamformees 204 may decode NDP-A 230 or 430, decode NDP 332 or 432, determine feedback based on the type of feedback 342.1 or 442.2 and the NDP 332 or 432, encode the feedback frame 336 or 436, and an apparatus of the beamformees 204 may configure the beamformees 204 to transmit the feedback 336 or 436 in accordance with the corresponding resource allocation 342.1 or 442.2.

Returning to operation 904, If the sounding is for the UL sounding, the method 900 continues at operation 908 with decoding the TF-S that further comprises a resource allocation for the station to transmit NDPs, encoding the NDPs, and configuring the station to transmit the NDPs in accordance with the resource allocation. For example, beamformees 204 may further decode TF-S 234.2 or TF-S 434.1 to comprises resource allocations 242.2 and 442.1, respectively. The beamformees 204 may further encode NDPs 238 and NDPs 438. An apparatus of the beamformees 204 may configure the beamformees 204 to transmit the NDPs 238 and 338 in accordance with the resource allocations 242.2 and 442.1, respectively.

Figure 10:
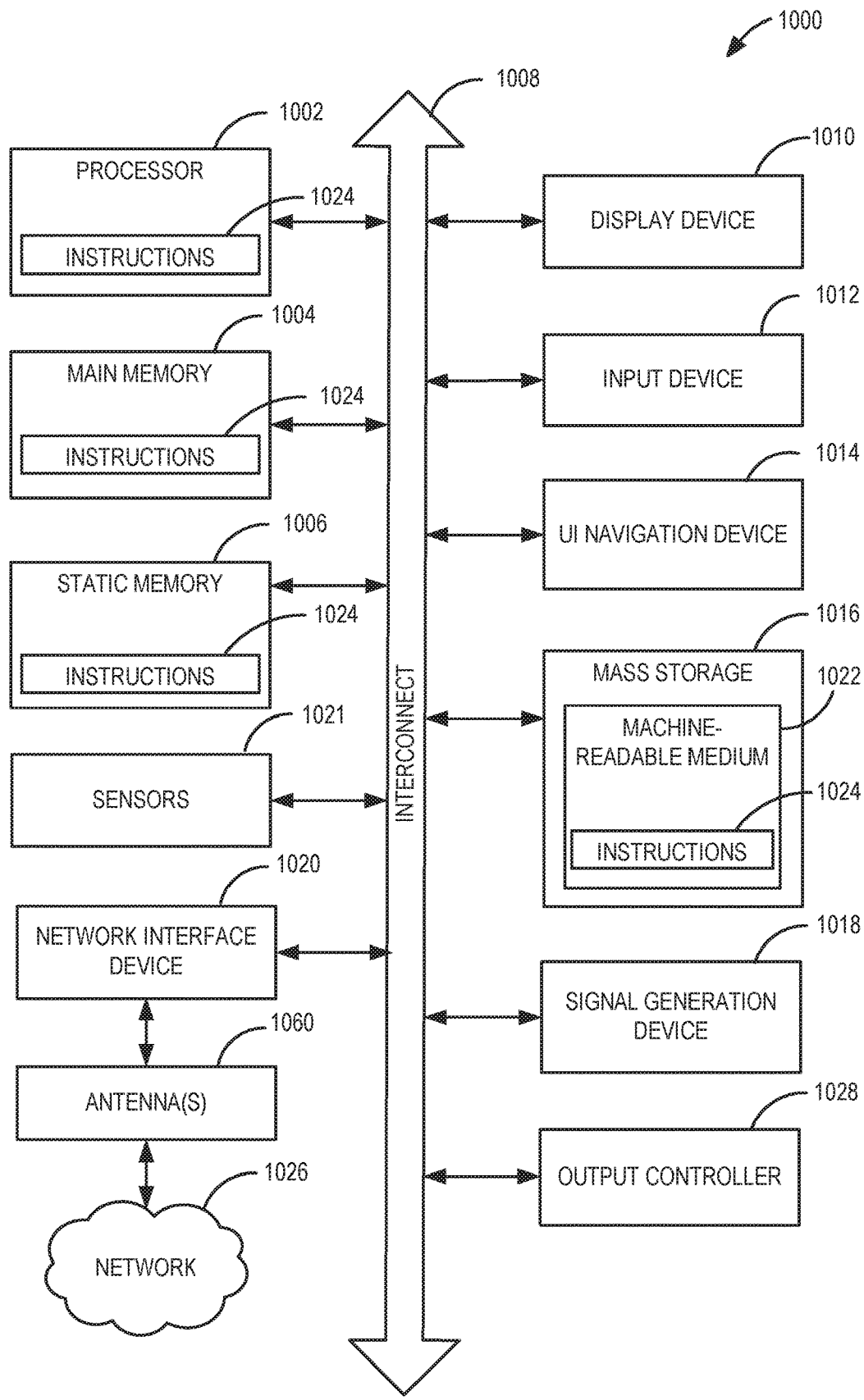
FIG. 10 illustrates a block diagram of an example machine upon which any one or more of the techniques (e.g., methodologies) discussed herein may perform, in accordance with some embodiments.

FIG. 10 illustrates a block diagram of an example machine 1000 upon which any one or more of the techniques (e.g., methodologies) discussed herein may perform, in accordance with some embodiments. In alternative embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in peer-to-peer (P2P) (or other distributed) network environment. The machine 1000 may be a master station 102, HE station 104, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 1000 may include a hardware processor 1002 (e.g., a central processing unit (CPU), a graphics processing unit (GPU), a hardware processor core, or any combination thereof), a main memory 1004 and a static memory 1006, some or all of which may communicate with each other via an interlink (e.g., bus) 1008. The machine 1000 may further include a display device 1010, an input device 1012 (e.g., a keyboard), and a user interface (UI) navigation device 1014 (e.g., a mouse). In an example, the display device 1010, input device 1012 and UI navigation device 1014 may be a touch screen display. The machine 1000 may additionally include a mass storage (e.g., drive unit) 1016, a signal generation device 1018 (e.g., a speaker), a network interface device 1020, and one or more sensors 1021, such as a global positioning system (GPS) sensor, compass, accelerometer, or other sensor. The machine 1000 may include an output controller 1028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 1002 and/or instructions 1024 may comprise processing circuitry and/or transceiver circuitry.

The storage device 1016 may include a machine readable medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within static memory 1006, or within the hardware processor 1002 during execution thereof by the machine 1000. In an example, one or any combination of the hardware processor 1002, the main memory 1004, the static memory 1006, or the storage device 1016 may constitute machine readable media.

While the machine readable medium 1022 is illustrated as a single medium, the term "machine readable medium" may include a single medium or multiple media (e.g., a centralized or distributed database, and/or associated caches and servers) configured to store the one or more instructions 1024.

An apparatus of the machine 1000 may be one or more of a hardware processor 1002 (e.g., a central processing unit (CPU), a graphics processing unit (GPU), a hardware processor core, or any combination thereof), a main memory 1004 and a static memory 1006, some or all of which may communicate with each other via an interlink (e.g., bus) 1008.

The term "machine readable medium" may include any medium that is capable of storing, encoding, or carrying instructions for execution by the machine 1000 and that cause the machine 1000 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 1024 may further be transmitted or received over a communications network 1026 using a transmission medium via the network interface device 1020 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 1020 may include one or more physical jacks (e.g., Ethernet, coaxial, or phone jacks) or one or more antennas to connect to the communications network 1026. In an example, the network interface device 1020 may include one or more antennas 1060 to wirelessly communicate using at least one of single-input multiple-output (SIMO), multiple-input multiple-output (MIMO), or multiple-input single-output (MISO) techniques. In some examples, the network interface device 1020 may wirelessly communicate using Multiple User MIMO techniques. The term "transmission medium" shall be taken to include any intangible medium that is capable of storing, encoding or carrying instructions for execution by the machine 1000, and includes digital or analog communications signals or other intangible medium to facilitate communication of such software.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

The following examples pertain to further embodiments. Example 1 is an apparatus of a wireless device, the apparatus including: memory; and processing circuitry coupled to the memory, the processing circuity configured to: encode a trigger frame for sounding (TF-S), the TF-S including an indication of whether a sounding is for uplink (UL) sounding or downlink (DL) sounding, and the TF-S including an indication of stations to participate in the UL sounding or the DL sounding; and configure the wireless device to transmit the TF-S to the stations.

In Example 2, the subject matter of Example 1 optionally includes where a field indicates whether the sounding is for UL sounding or the DL sounding, and where the field is a part of one of the following group: a media access control (MAC) portion of the TF-S, a frame control of the TF-S, and a physical preamble of the TF-S.

In Example 3, the subject matter of any one or more of Examples 1-2 optionally include where the processing circuitry is further configured to: if the sounding is for the DL sounding, encode a null data packet announcement (NDP-A), encode a null data packet (NDP), configure the wireless device to transmit the NDP-A, and configure the wireless device to transmit the NDP.

In Example 4, the subject matter of Example 3 optionally includes where the processing circuitry is further configured to: encode the TF-S to comprise resource allocations for the stations to transmit feedback and to comprise an indication of a type of feedback, and receive feedback frames from the stations in accordance with the resource allocations.

In Example 5, the subject matter of Example 4 optionally includes where the indication of the type of feedback is one from a signal to noise ratio, a received signal strength, a feedback or steering matrix, and channel state information (CSI).

In Example 6, the subject matter of any one or more of Examples 4-5 optionally include where the processing circuitry is further configured to: determine a beamforming matrix based on the feedback frames from the stations.

In Example 7, the subject matter of any one or more of Examples 1-6 optionally include where the processing circuitry is further configure to: if the sounding is for the UL sounding, encode the TF-S to comprise resource allocations for the stations to transmit null data packets (NDPs) to the wireless device, and decode NDPs from the stations, where the NDPs are to be received in accordance with the resource allocations.

In Example 8, the subject matter of Example 7 optionally includes where the NDPs from the stations are high-efficiency long training fields (HE-LTFs).

In Example 9, the subject matter of any one or more of Examples 7-8 optionally include where the resource allocations for the stations comprise an indication of a frequency and bandwidth, a number of spatial streams, and an index of the spatial streams.

In Example 10, the subject matter of any one or more of Examples 7-9 optionally include where the processing circuitry is further configured to: determine a beamforming matrix based on the NDP from the stations.

In Example 11, the subject matter of any one or more of Examples 7-10 optionally include where the NDPs from the stations are to be received a short interframe space (SIFS) after the transmission of the TF-S.

In Example 12, the subject matter of any one or more of Examples 1-11 optionally include where the processing circuitry is further configured to: encode a null data packet announcement (NDP-A) including an indication of the UL sounding followed by the DL sounding; and configure the wireless device to transmit the NDP-A.

In Example 13, the subject matter of any one or more of Examples 1-12 optionally include where the wireless device and the stations are each one from the following group: an Institute of Electrical and Electronic Engineers (IEEE) 13 is missing parent: 13 is missing parent: 802.11 ax access point, an IEEE 802.11 ax station, an IEEE 13 is missing parent: 13 is missing parent: 802.11 station, and an IEEE 802.11 access point.

In Example 14, the subject matter of any one or more of Examples 1-13 optionally include transceiver circuitry coupled to the processing circuitry.

Example 15 is a non-transitory computer-readable storage medium that stores instructions for execution by one or more processors, the instructions to configure the one or more processors to cause a wireless device to: encode a trigger frame for sounding (TF-S), the TF-S including an indication of whether the sounding is for uplink (UL) sounding or downlink (DL) sounding, and the TF-S including an indication of stations to participate in the UL sounding or the DL sounding; and configure the wireless device to transmit the TF-S to the stations.

In Example 16, the subject matter of Example 15 optionally includes where the instructions further configure the one or more processors to cause the wireless device to: if the sounding is for the DL sounding, encode a null data packet announcement (NDP-A), encode a null data packet (NDP), configure the wireless device to transmit the NDP-A, configure the wireless device to transmit the NDP, encode the TF-S to comprise resource allocations for the stations to transmit feedback and to comprise an indication of a type of feedback, and receive feedback frames from the stations in accordance with the resource allocations.

In Example 17, the subject matter of any one or more of Examples 15-16 optionally include where the instructions further configure the one or more processors to cause the wireless device to: if the sounding is for the UL sounding, encode the TF-S to comprise resource allocations for the stations to transmit null data packets (NDPs) to the wireless device, and decode NDPs from the stations, where the NDPs are to be received in accordance with the resource allocations.

Example 18 is a method performed by a wireless device, the method including: encoding a trigger frame for sounding (TF-S), the TF-S including an indication of whether the sounding is for uplink (UL) sounding or (DL) sounding, and the TF-S including an indication of stations to participate in the UL sounding or the DL sounding; and configuring the wireless device to transmit the TF-S to the stations.

In Example 19, the subject matter of Example 18 optionally includes the method further including: if the sounding is for the DL sounding, encoding a null data packet announcement (NDP-A), encoding a null data packet (NDP), configuring the wireless device to transmit the NDP-A, configuring the wireless device to transmit the NDP, encoding the TF-S to comprise resource allocations for the stations to transmit feedback and to comprise an indication of a type of feedback, and receiving feedback frames from the stations in accordance with the resource allocations.

In Example 20, the subject matter of any one or more of Examples 18-19 optionally include the method further including: if the sounding is for the UL sounding, encoding the TF-S to comprise resource allocations for the stations to transmit null data packets (NDPs) to the wireless device, and decoding NDPs from the stations, where the NDPs are to be received in accordance with the resource allocations.

Example 21 is an apparatus of a station, the apparatus including: memory; and processing circuitry coupled to the memory, the processing circuity configured to: decode a trigger frame for sounding (TF-S), the TF-S including an indication of whether the sounding is for uplink (UL) sounding or downlink (DL) sounding, and the TF-S including an indication of stations to participate in the UL sounding or the DL sounding; if the sounding is for the DL sounding, decode the TF-S that further comprises a resource allocation for the station to transmit feedback and comprises an indication of a type of feedback, decode a null data packet announcement (NDP-A), decode a null data packet (NDP), determine feedback based on the type of feedback and the NDP, encode a feedback frame with the feedback, and configure the station to transmit the feedback frame in accordance with the resource allocation; and if the sounding is for the UL sounding, decode the TF-S that further comprises a resource allocation for the station to transmit null data packets (NDPs), encode the NDPs, and configure the station to transmit the NDPs in accordance with the resource allocation.

In Example 22, the subject matter of Example 21 optionally includes transceiver circuitry coupled to the processing circuitry.

Example 23 is an apparatus of a wireless device, the apparatus including: memory; and processing circuitry coupled to the memory, the processing circuitry configured to: encode a null data packet announcement (NDP-A), the NDP-A including an indication of whether a sounding is for uplink (UL) sounding or downlink (DL) sounding, and the NDP-A further including an indication if the sounding is a single user (SU) sounding or a multiple-user (MU) sounding; and configure the wireless device to transmit the NDP-A to one or more stations.

In Example 24, the subject matter of Example 23 optionally includes the processing circuitry further configured to: if the sounding is the SU sounding and the sounding is for UL sounding, encode the NDP-A to further comprise a resource allocation for one station of the one or more stations to transmit one or more null data packets (NDPs) to the wireless device, and decode the one or more NDPs from the one station, where the one or more NDPs are to be received in accordance with the resource allocation.

In Example 25, the subject matter of any one or more of Examples 23-24 optionally include the processing circuitry further configured to: if the sounding is the SU sounding and the sounding is the DL sounding, encode the NDP-A to further comprise a resource allocation for one station of the one or more stations to transmit a feedback frame to the wireless device and to further comprise a type of feedback for the one station, encode a high-efficiency (HE) null data packet (HE-NDP), configure the wireless device to transmit the HE-NDP, and decode the feedback frame from the one station.

In Example 26, the subject matter of any one or more of Examples 23-25 optionally include transceiver circuitry coupled to the processing circuitry.

Example 27 is an apparatus of a station, the apparatus including: memory; and processing circuitry coupled to the memory, the processing circuitry configured to: decode a null data packet announcement (NDP-A), the NDP-A including an indication of whether a sounding is for uplink (UL) sounding or downlink (DL) sounding, and the NDP-A further including an indication if the sounding is a single user (SU) sounding or a multiple-user (MU) sounding; if the a receiver address of the NDP-A and a station one address of the NDP-A are both the address of the station, and the sounding is for UL sounding, decode the NDP-A that further comprise a resource allocation for the station to transmit one or more null data packets (NDPs), and configure the station to transmit the one or more NDPs in accordance with the resource allocation; if the a receiver address of the NDP-A and a station one address of the NDP-A are both the address of the station, and the sounding is the DL sounding, decode the NDP-A to further comprise a resource allocation for the station to transmit a feedback frame and to further comprise a type of feedback for the station to determine feedback, decode a high-efficiency (HE) null data packet (HE-NDP), determine feedback based on the HE-NDP and the type of feedback, encode a feedback frame including the feedback, and configure the station to transmit the feedback frame in accordance with the resource allocation.

In Example 28, the subject matter of Example 27 optionally includes transceiver circuitry coupled to the processing circuitry.

Example 29 is an apparatus of a wireless device, the apparatus including: means for encoding a trigger frame for sounding (TF-S), the TF-S including an indication of whether a sounding is for uplink (UL) sounding or downlink (DL) sounding, and the TF-S including an indication of stations to participate in the UL sounding or the DL sounding; and means for configuring the wireless device to transmit the TF-S to the stations.

In Example 30, the subject matter of Example 29 optionally includes where a field indicates whether the sounding is for UL sounding or the DL sounding, and where the field is a part of one of the following group: a media access control (MAC) portion of the TF-S, a frame control of the TF-S, and a physical preamble of the TF-S.

In Example 31, the subject matter of any one or more of Examples 29-30 optionally include if the sounding is for the DL sounding, encode a null data packet announcement (NDP-A), encode a null data packet (NDP), means for configuring the wireless device to transmit the NDP-A, and configure the wireless device to transmit the NDP.

In Example 32, the subject matter of Example 31 optionally includes where the processing circuitry is further configured to: means for encoding the TF-S to comprise resource allocations for the stations to transmit feedback and to comprise an indication of a type of feedback, and means for receiving feedback frames from the stations in accordance with the resource allocations.

In Example 33, the subject matter of Example 32 optionally includes where the indication of the type of feedback is one from a signal to noise ratio, a received signal strength, a feedback or steering matrix, and channel state information (CSI).

In Example 34, the subject matter of Example 33 optionally includes means for determining a beamforming matrix based on the feedback frames from the stations.

In Example 35, the subject matter of any one or more of Examples 29-34 optionally include if the sounding is for the UL sounding, means for encoding the TF-S to comprise resource allocations for the stations to transmit null data packets (NDPs) to the wireless device, and decode NDPs from the stations, where the NDPs are to be received in accordance with the resource allocations.

In Example 36, the subject matter of Example 35 optionally includes where the NDPs from the stations are high-efficiency long training fields (HE-LTFs).

In Example 37, the subject matter of Example 36 optionally includes where the resource allocations for the stations comprise an indication of a frequency and bandwidth, a number of spatial streams, and an index of the spatial streams.

In Example 38, the subject matter of Example 37 optionally includes means for determining a beamforming matrix based on the NDP from the stations.

In Example 39, the subject matter of any one or more of Examples 37-38 optionally include where the NDPs from the stations are to be received a short interframe space (SIFS) after the transmission of the TF-S.

In Example 40, the subject matter of any one or more of Examples 29-39 optionally include encode a null data packet announcement (NDP-A) including an indication of the UL sounding followed by the DL sounding; and configure the wireless device to transmit the NDP-A.

In Example 41, the subject matter of any one or more of Examples 29-40 optionally include where the wireless device and the stations are each one from the following group: an Institute of Electrical and Electronic Engineers (IEEE) 41 is missing parent: 41 is missing parent: 802.1 lax access point, an IEEE 802.1 lax station, an IEEE 41 is missing parent: 41 is missing parent: 802.11 station, and an IEEE 802.11 access point.

In Example 42, the subject matter of any one or more of Examples 1-41 optionally include means for transmitting and receiving radio waves.

Example 43 is a non-transitory computer-readable storage medium that stores instructions for execution by one or more processors, the instructions to configure the one or more processors to cause a wireless device to: decode a trigger frame for sounding (TF-S), the TF-S including an indication of whether the sounding is for uplink (UL) sounding or downlink (DL) sounding, and the TF-S including an indication of stations to participate in the UL sounding or the DL sounding; if the sounding is for the DL sounding, decode the TF-S that further comprises a resource allocation for the station to transmit feedback and comprises an indication of a type of feedback, decode a null data packet announcement (NDP-A), decode a null data packet (NDP), determine feedback based on the type of feedback and the NDP, encode a feedback frame with the feedback, and configure the station to transmit the feedback frame in accordance with the resource allocation; and if the sounding is for the UL sounding, decode the TF-S that further comprises a resource allocation for the station to transmit null data packets (NDPs), encode the NDPs, and configure the station to transmit the NDPs in accordance with the resource allocation.

Example 44 is a method performed by an apparatus of a wireless device, the method including: decoding a trigger frame for sounding (TF-S), the TF-S including an indication of whether the sounding is for uplink (UL) sounding or downlink (DL) sounding, and the TF-S including an indication of stations to participate in the UL sounding or the DL sounding; if the sounding is for the DL sounding, decoding the TF-S that further comprises a resource allocation for the station to transmit feedback and comprises an indication of a type of feedback, decoding a null data packet announcement (NDP-A), decoding a null data packet (NDP), determining feedback based on the type of feedback and the NDP, encoding a feedback frame with the feedback, and configuring the station to transmit the feedback frame in accordance with the resource allocation; and if the sounding is for the UL sounding, decoding the TF-S that further comprises a resource allocation for the station to transmit null data packets (NDPs), encode the NDPs, and configuring the station to transmit the NDPs in accordance with the resource allocation.

Example 45 is an apparatus of a wireless device, the apparatus including: means for decoding a trigger frame for sounding (TF-S), the TF-S including an indication of whether the sounding is for uplink (UL) sounding or downlink (DL) sounding, and the TF-S including an indication of stations to participate in the UL sounding or the DL sounding; if the sounding is for the DL sounding, means for decoding the TF-S that further comprises a resource allocation for the station to transmit feedback and comprises an indication of a type of feedback, means for decoding a null data packet announcement (NDP-A), means for decoding a null data packet (NDP), determining feedback based on the type of feedback and the NDP, means for encoding a feedback frame with the feedback, and means for configuring the station to transmit the feedback frame in accordance with the resource allocation; and if the sounding is for the UL sounding, means for decoding the TF-S that further comprises a resource allocation for the station to transmit null data packets (NDPs), means for encode the NDPs, and means for configuring the station to transmit the NDPs in accordance with the resource allocation.

Example 46 is a non-transitory computer-readable storage medium that stores instructions for execution by one or more processors, the instructions to configure the one or more processors to cause a wireless device to: encode a null data packet announcement (NDP-A), the NDP-A including an indication of whether a sounding is for uplink (UL) sounding or downlink (DL) sounding, and the NDP-A further including an indication if the sounding is a single user (SU) sounding or a multiple-user (MU) sounding; and configure the wireless device to transmit the NDP-A to one or more stations.

In Example 47, the subject matter of Example 46 optionally includes the instructions to further configure the one or more processor to cause the wireless device to: if the sounding is the SU sounding and the sounding is for UL sounding, encode the NDP-A to further comprise a resource allocation for one station of the one or more stations to transmit one or more null data packets (NDPs) to the wireless device, and decode the one or more NDPs from the one station, where the one or more NDPs are to be received in accordance with the resource allocation.

In Example 48, the subject matter of any one or more of Examples 46-47 optionally include the instructions to further configure the one or more processor to cause the wireless device to: if the sounding is the SU sounding and the sounding is the DL sounding, encode the NDP-A to further comprise a resource allocation for one station of the one or more stations to transmit a feedback frame to the wireless device and to further comprise a type of feedback for the one station, encode a high-efficiency (HE) null data packet (HE-NDP), configure the wireless device to transmit the HE-NDP, and decode the feedback frame from the one station.

Example 49 is a method performed by an apparatus of a wireless device, the method including: encoding a null data packet announcement (NDP-A), the NDP-A including an indication of whether a sounding is for uplink (UL) sounding or downlink (DL) sounding, and the NDP-A further including an indication if the sounding is a single user (SU) sounding or a multiple-user (MU) sounding; and configuring the wireless device to transmit the NDP-A to one or more stations.

In Example 50, the subject matter of Example 49 optionally includes the method further including: if the sounding is the SU sounding and the sounding is for UL sounding, encoding the NDP-A to further comprise a resource allocation for one station of the one or more stations to transmit one or more null data packets (NDPs) to the wireless device, and decoding the one or more NDPs from the one station, where the one or more NDPs are to be received in accordance with the resource allocation.

In Example 51, the subject matter of any one or more of Examples 49-50 optionally include the method further including: if the sounding is the SU sounding and the sounding is the DL sounding, encoding the NDP-A to further comprise a resource allocation for one station of the one or more stations to transmit a feedback frame to the wireless device and to further comprise a type of feedback for the one station, encoding a high-efficiency (HE) null data packet (HE-NDP), configuring the wireless device to transmit the HE-NDP, and decode the feedback frame from the one station.

Example 52 is an apparatus of a wireless device, the apparatus including: means for encoding a null data packet announcement (NDP-A), the NDP-A including an indication of whether a sounding is for uplink (UL) sounding or downlink (DL) sounding, and the NDP-A further including an indication if the sounding is a single user (SU) sounding or a multiple-user (MU) sounding; and means for configuring the wireless device to transmit the NDP-A to one or more stations.

In Example 53, the subject matter of Example 52 optionally includes the apparatus further including: if the sounding is the SU sounding and the sounding is for UL sounding, means for encoding the NDP-A to further comprise a resource allocation for one station of the one or more stations to transmit one or more null data packets (NDPs) to the wireless device, and means for decoding the one or more NDPs from the one station, where the one or more NDPs are to be received in accordance with the resource allocation.

In Example 54, the subject matter of Example 53 optionally includes the apparatus further including: if the sounding is the SU sounding and the sounding is the DL sounding, encoding the NDP-A to further comprise a resource allocation for one station of the one or more stations to transmit a feedback frame to the wireless device and to further comprise a type of feedback for the one station, means for encoding a high-efficiency (HE) null data packet (HE-NDP), means for configuring the wireless device to transmit the HE-NDP, and decode the feedback frame from the one station.

Example 55 is a non-transitory computer-readable storage medium that stores instructions for execution by one or more processors, the instructions to configure the one or more processors to cause a wireless device to: decode a null data packet announcement (NDP-A), the NDP-A including an indication of whether a sounding is for uplink (UL) sounding or downlink (DL) sounding, and the NDP-A further including an indication if the sounding is a single user (SU) sounding or a multiple-user (MU) sounding; if the a receiver address of the NDP-A and a station one address of the NDP-A are both the address of the station, and the sounding is for UL sounding, decode the NDP-A that further comprise a resource allocation for the station to transmit one or more null data packets (NDPs), and configure the station to transmit the one or more NDPs in accordance with the resource allocation; if the a receiver address of the NDP-A and a station one address of the NDP-A are both the address of the station, and the sounding is the DL sounding, decode the NDP-A to further comprise a resource allocation for the station to transmit a feedback frame and to further comprise a type of feedback for the station to determine feedback, decode a high-efficiency (HE) null data packet (HE-NDP), determine feedback based on the HE-NDP and the type of feedback, encode a feedback frame including the feedback, and configure the station to transmit the feedback frame in accordance with the resource allocation.

Example 56 is a method performed by an apparatus of a wireless device, the method including: decoding a null data packet announcement (NDP-A), the NDP-A including an indication of whether a sounding is for uplink (UL) sounding or downlink (DL) sounding, and the NDP-A further including an indication if the sounding is a single user (SU) sounding or a multiple-user (MU) sounding; if the a receiver address of the NDP-A and a station one address of the NDP-A are both the address of the station, and the sounding is for UL sounding, decoding the NDP-A that further comprise a resource allocation for the station to transmit one or more null data packets (NDPs), and configuring the station to transmit the one or more NDPs in accordance with the resource allocation; if the a receiver address of the NDP-A and a station one address of the NDP-A are both the address of the station, and the sounding is the DL sounding, decode the NDP-A to further comprise a resource allocation for the station to transmit a feedback frame and to further comprise a type of feedback for the station to determine feedback, decoding a high-efficiency (HE) null data packet (HE-NDP), determine feedback based on the HE-NDP and the type of feedback, encoding a feedback frame including the feedback, and configuring the station to transmit the feedback frame in accordance with the resource allocation.

Example 57 is an apparatus of a wireless device, the apparatus including: means for decoding a null data packet announcement (NDP-A), the NDP-A including an indication of whether a sounding is for uplink (UL) sounding or downlink (DL) sounding, and the NDP-A further including an indication if the sounding is a single user (SU) sounding or a multiple-user (MU) sounding; if the a receiver address of the NDP-A and a station one address of the NDP-A are both the address of the station, and the sounding is for UL sounding, decoding the NDP-A that further comprise a resource allocation for the station to transmit one or more null data packets (NDPs), and means for configuring the station to transmit the one or more NDPs in accordance with the resource allocation: if the a receiver address of the NDP-A and a station one address of the NDP-A are both the address of the station, and the sounding is the DL sounding, decode the NDP-A to further comprise a resource allocation for the station to transmit a feedback frame and to further comprise a type of feedback for the station to determine feedback, means for decoding a high-efficiency (HE) null data packet (HE-NDP), determine feedback based on the HE-NDP and the type of feedback, means for encoding a feedback frame including the feedback, and configuring the station to transmit the feedback frame in accordance with the resource allocation.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a wireless device, the apparatus comprising: memory; and processing circuitry coupled to the memory, the processing circuitry configured to:
    encode a trigger frame (TF) for sounding, the TF comprising an indication of uplink (IL) sounding, the TF further comprising first indications of stations to participate in the UL sounding and second indications of resource allocations for the stations to transmit null data packets (NDPs) in response to the TF, the NDPs to be transmitted a short interframe space (SIFS) after receiving the TF;
    configure the wireless device to transmit the TF to the stations;
    receive the NDPs on different spatial streams simultaneously in time from the stations in accordance with the resource allocations;

encode a NDP announce (NDP-A) frame, the NDP-A frame comprising an indication of whether the NDP-A frame is for UL sounding or downlink (DL) sounding and third indications of the stations, wherein the indication of whether the NDP-A frame is for UL sounding or DL sounding indicates DL sounding;

configure the wireless device to transmit the NDP-A; and configure the wireless device to transmit DL NDPs to the stations in accordance with the NDP-A frame.

2. The apparatus of claim 1, wherein the NDPs from the stations comprise high-efficiency long training fields (HE-LTFs).

3. The apparatus of claim 1, wherein the resource allocations for the stations comprise an indication of a bandwidth, an indication of a number of spatial streams, and an index of the spatial streams.

4. The apparatus of claim 1, wherein the wireless device and the stations are each one from the following group: an institute of Electrical and Electronic Engineers (IEEE) 802.11ax access point, an IEEE 802.11ax station, an IEEE 802.11 station, an IEEE 802.11 access point, an IEEE 802.11az station, and an IEEE 802.11az access point.

5. The apparatus of claim 1, further comprising transceiver circuitry coupled to the processing circuitry.

6. The apparatus of claim 1, wherein configure the wireless device to transmit the NDP-A further comprises: configure the wireless device to transmit the NDP-A a SIFS after a last NDP of the NDPs.

7. The apparatus of claim 1, wherein the first indications of the stations each comprise an association identification of a corresponding station of the stations.

8. The apparatus of claim 2, wherein the resource allocations for the stations further comprise an indication of a number of repetitions of the HE LTFs to transmit.

9. The apparatus of claim 1, wherein configure the wireless device to transmit the DL NDPs to the stations further comprises:

configure the wireless device to transmit the DL NDPs to the stations a SITS after transmitting the NDP-A.

10. The apparatus of claim 1, wherein the TF is a first TF and wherein the processing circuitry is further configured to:

configure a second TF, the second TF comprising fourth indications of the stations and fifth indications of resource allocations for the stations to transmit feedback reports to the wireless device, the feedback reports based on the DL NDPs; and configure the wireless device to transmit the second TF.

11. The apparatus of claim 10, wherein the processing circuitry is further configured to:

decode the feedback reports from the stations in accordance with the resource allocations indicated by the fourth indications.

12. The apparatus of claim 10, wherein the second TF comprises an indication that the second TF is for a plurality of stations.

13. A non-transitory computer-readable storage medium that stores instructions for execution by one or more processors of a wireless device, the instructions to configure the one or more processors to:

encode a trigger frame (TF) for sounding, the TF comprising an indication of uplink (UL) sounding, the TF further comprising first indications of stations to participate in the UL sounding and second indications of resource allocations for the stations to transmit null data packets (NDPs) in response to the TF the NDPs to be transmitted a short interframe space (SIFS) after receiving the TF;

configure the wireless device to transmit the TF to the stations;

receive the NDPs on different spatial streams simultaneously from the stations in accordance with the resource allocations;

encode a NDP announce (NDP-A) frame, the NDP-A frame comprising an indication of whether the NDP-A frame is for UL sounding or downlink (DL) sounding and third indications of the stations, wherein the indication of whether the NDP-A frame is for UL sounding or DL sounding indicates DL sounding;

configure the wireless device to transmit the NDP-A; and configure the wireless device to transmit DL NDPs to the stations in accordance with the NDP-A frame.

14. The non-transitory computer-readable storage medium of claim 13, wherein the NDPs from the stations comprise high-efficiency long training fields (HE-LTFs).

15. The non-transitory computer-readable storage medium of claim 13, wherein the resource allocations for the stations comprise an indication of a bandwidth, an indication of a number of spatial streams, and an index of the spatial streams.

16. The non-transitory computer-readable storage medium of claim 13, wherein the wireless device and the stations are each one from the following group: an Institute of Electrical and Electronic Engineers (IEEE) 802.11 ax access point, an IEEE 802.11ax station, an IEEE 802.11 station, an IEEE 802.11 access point, an IEEE 802.11az station, and an IEEE 802.11az access point.

17. The non-transitory computer-readable storage medium of claim 13, where configure the wireless device to transmit the NDP-A further comprises; configure the wireless device to transmit the NDP-A a SIFS after receiving a last NDP of the NDPs.

18. The non-transitory computer-readable storage medium of claim 13, wherein the first indications of the stations each comprise an association identification of a corresponding station of the stations.

19. A method performed by an apparatus of a wireless device; the method comprising:

encoding a trigger frame (TF) for sounding, the TF comprising an indication of uplink (UL) sounding, the TF further comprising first indications of stations to participate in the UL sounding and second indications of resource allocations for the stations to transmit null data packets (NDPs) in response to the TF, the NDPs to be transmitted a short interframe space (SIFS) after receiving the TF;

configuring the wireless device to transmit the to the stations;

receiving the NDPs on different spatial streams simultaneously in time from the stations in accordance with the resource allocations;

encoding a NDP announce (NDP-A) frame, the NDP-A frame comprising an indication of whether the NDP-A frame is for UL sounding or downlink (DL) sounding and third indications of the stations, wherein the indication of whether the NDP-A frame is for UL sounding or DL sounding indicates DL sounding;

configuring the wireless device to transmit the NDP-A; and configuring the wireless device to transmit DL NDPs to the stations in accordance with the NDP-A frame.

20. The method of claim 19, wherein the NDPs from the stations comprise high-efficiency long training fields (HE-LTFs).

21. The method of claim 19, wherein the resource allocations for the stations comprise an indication of a bandwidth, an indication of a number of spatial streams, and an index of the spatial streams.

22. An apparatus of a station, the apparatus comprising:
memory; and
processing circuitry coupled to the memory, the processing circuitry configured to:
decode a trigger frame (TF) for sounding, the TF comprising an indication of uplink (UL) sounding, the TF further comprising first indications of stations to participate in the UL sounding and second indications of resource allocations for the stations to transmit null data packets (NDPs) in response to the TF, the NDPs to be transmitted a short interframe space (SIFS) after receiving the TF, wherein the first indications of stations comprises an association identification (AID) of the station;
configure the station to transmit, the SIFS after receiving the TF, a NDP of the NDPs in accordance with a corresponding resource allocation of the resource allocations;
decode a NDP announce (NDP-A) frame, the NDP-A frame comprising an indication of whether the NDP-A frame is for UL sounding or downlink (DL) sounding and third indications of the stations, wherein the indication of whether the NDP-A frame is for UL sounding or DL sounding indicates DL sounding, wherein the third indications of stations comprises the AID of the station;
decode DL NDPs in accordance with the NDP-A frame.

23. The apparatus of claim 22, wherein the NDP comprises high-efficiency long training fields (HE-LTFs).

24. The apparatus of claim 23, wherein the resource allocations for the stations further comprise an indication of a number of repetitions of the HE LTFs to transmit.

25. The apparatus of claim 22, wherein the resource allocations for the stations comprise an indication of a bandwidth, an indication of a number of spatial streams, and an index of the spatial streams.

26. The apparatus of claim 22, wherein the station is configured to operate in accordance with Institute of Electrical and Electronic Engineers (IEEE) 802.11az.

27. The apparatus of claim 22, further comprising transceiver circuitry coupled to the processing circuitry.

28. A non-transitory computer-readable storage medium that stores instructions for execution by one or more processors of a station, the instructions to configure the one or more processors to:
decode a trigger frame (TF) for sounding, the TF comprising an indication of uplink (UL) sounding, the TF further comprising first indications of stations to participate in the UL sounding and second indications of resource allocations for the stations to transmit null data packets (NDPs) in response to the TF, the NDPs to be transmitted a short interframe space (SIFS) after receiving the TF, wherein the first indications of stations comprises an association identification (AID) of the station;
configure the station to transmit, the SIFS after receiving the TF, a NDP of the NDPs in accordance with a corresponding resource allocation of the resource allocations;
decode a NDP announce (NDP-A) frame, the NDP-A frame comprising an indication of whether the NDP-A frame is for UL sounding or downlink (DL) sounding and third indications of the stations, wherein the indication of whether the NDP-A frame is for UL sounding or DL sounding indicates DL sounding, wherein the third indications of stations comprises the AID of the station; decode DL NDPs in accordance with the NDP-A frame.

29. The apparatus of claim 28, wherein the NEW comprises high-efficiency long training fields (HE-LTFs).

30. The apparatus of claim 29, wherein the resource allocations for the stations further comprise an indication of a number of repetitions of the HE LTFs to transmit.

* * * * *

UNITED STATES PATENT AND TRADEMARK OFFICE
CERTIFICATE OF CORRECTION

PATENT NO. : 10,651,916 B2
APPLICATION NO. : 15/773202
DATED : May 12, 2020
INVENTOR(S) : Chittabrata Ghosh Page 1 of 1

It is certified that error appears in the above-identified patent and that said Letters Patent is hereby corrected as shown below:

In the Claims

In Column 20, Line 56, in Claim 1, delete "(IL)" and insert --(UL)-- therefor

In Column 21, Line 39, in Claim 9, delete "SITS" and insert --SIFS-- therefor

In Column 21, Line 65, in Claim 13, delete "TF" and insert --TF,-- therefor

In Column 22, Line 32, in Claim 17, delete "where" and insert --wherein-- therefor In Column 22, Line 33, in Claim 17, delete "comprises;" and insert --comprises:-- therefor In Column 22, Line 41, in Claim 19, delete "device;" and insert --device,-- therefor In Column 22, Line 50, in Claim 19, after "transmit the", insert --TF--

In Column 24, Line 34, in Claim 29, delete "NEW" and insert --NDP-- therefor

Signed and Sealed this
Fifth Day of January, 2021

Andrei Iancu
*Director of the United States Patent and Trademark Office*